Oct. 26, 1937.  A. L. STOCKWELL  2,097,217
PUSH RAKE
Filed Dec. 21, 1935    2 Sheets-Sheet 1
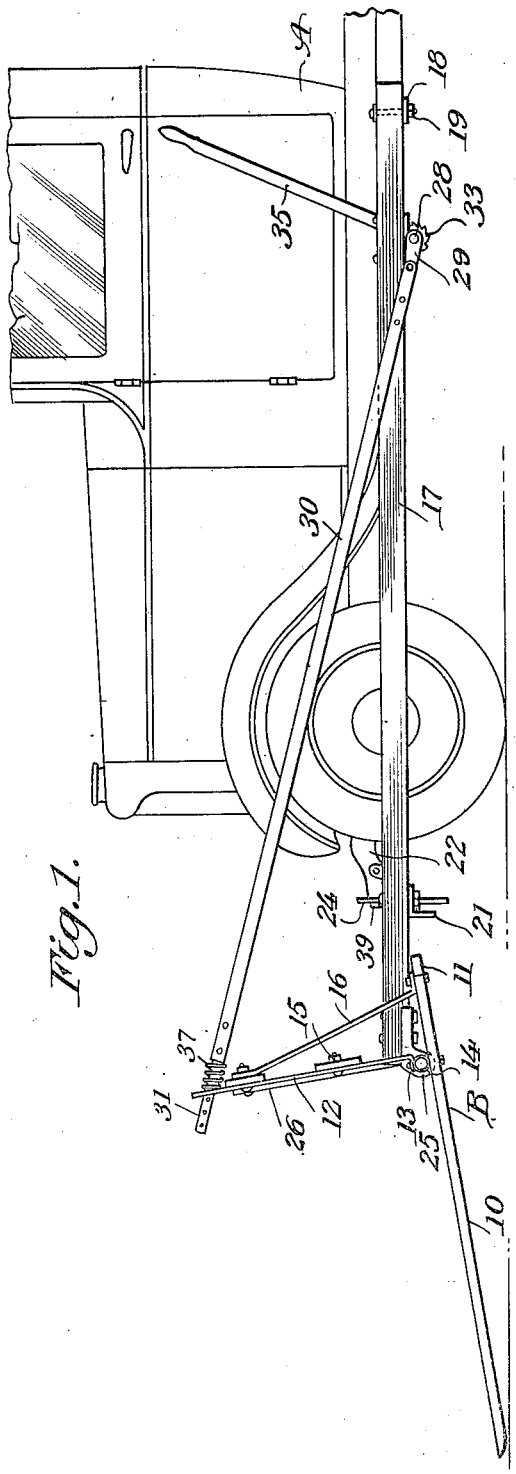
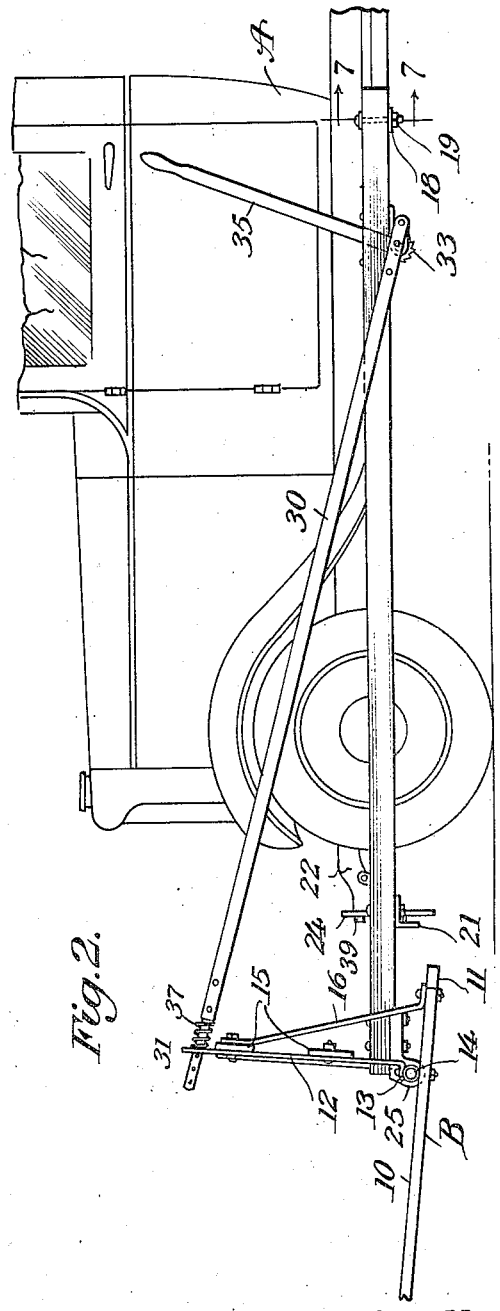
A. L. Stockwell
INVENTOR
ATTORNEY Oct. 26, 1937.  A. L. STOCKWELL  2,097,217
PUSH RAKE
Filed Dec. 21, 1935   2 Sheets—Sheet 2
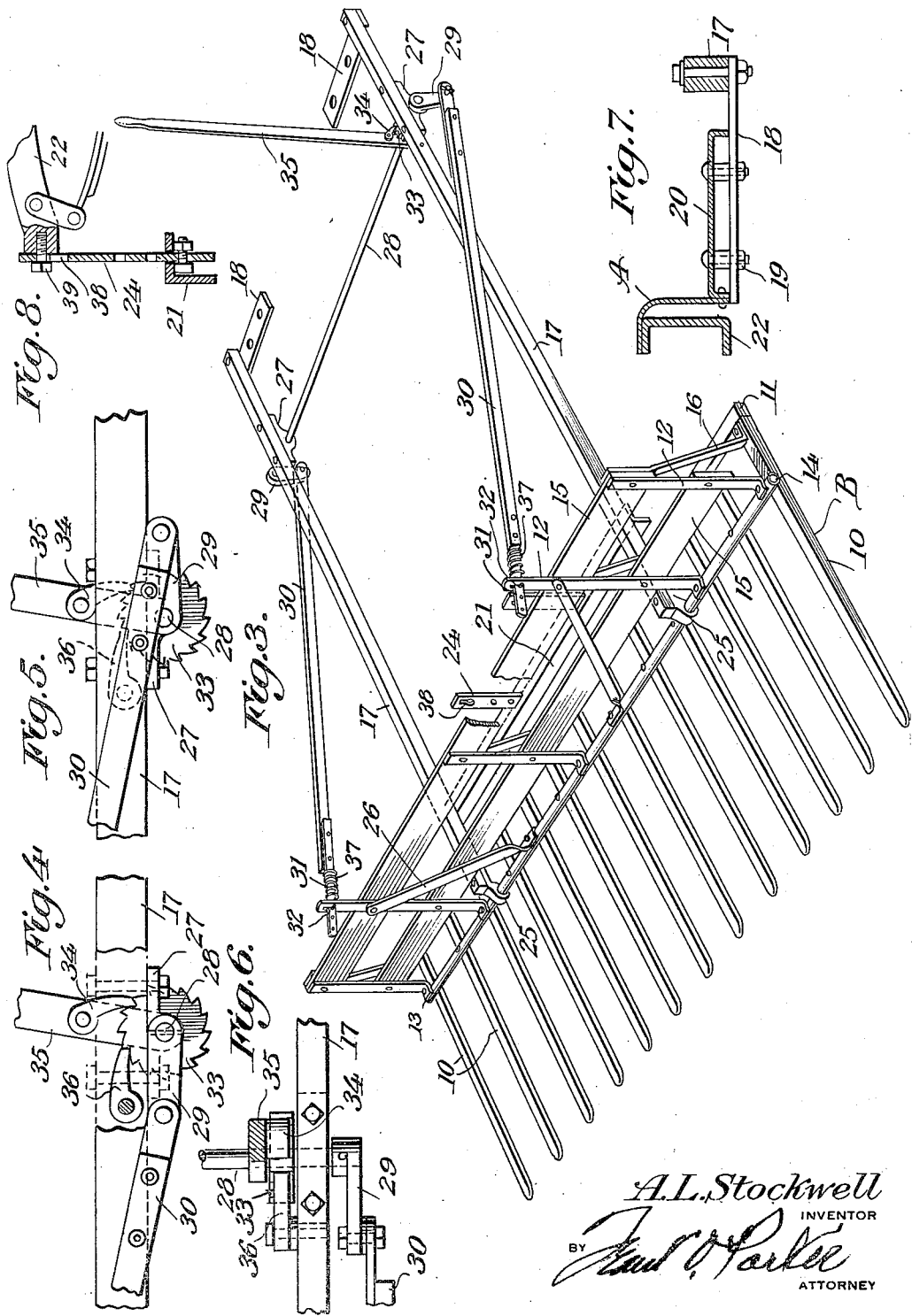
A. L. Stockwell
INVENTOR
BY
ATTORNEY Patented Oct. 26, 1937

2,097,217

UNITED STATES PATENT OFFICE 2,097,217

PUSH RAKE

Albert L. Stockwell, Larned, Kans.

Application December 21, 1935, Serial No. 55,624

2 Claims. (Cl. 56—27)

The invention relates to a rake and more especially to a push rake attachment for motor vehicles.

The primary object of the invention is the provision of an attachment of this character, wherein the rake is attached to the motor vehicle so that it can be controlled by a hand lever which latter is readily accessible to the driver or operator of such vehicle when occupying the driver's seat of the same.

Another object of the invention is the provision of an attachment of this character, wherein the construction of the same is novel in form and can be readily and easily attached to a motor vehicle of a truck or passenger type and when so attached can be easily operated for the raising and lowering of the tines of the rake.

A further object of the invention is the provision of an attachment of this character, wherein the control lever for the raising and lowering of the rake is located outside of the body of the motor vehicle and is within easy reach of the operative of such vehicle so that immediate and perfect control of the rake may be had without excessive labor on the part of such operator.

A still further object of the invention is the provision of an attachment of this character, which is simple in construction, thoroughly reliable and efficient in operation, strong, durable, easily applied to and removable from a motor vehicle, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 1 is a fragmentary side elevation of a motor vehicle showing the rake attachment constructed in accordance with the invention applied and the rake lowered.

Figure 2 is a similar view with the rake raised.

Figure 3 is a perspective view of the attachment removed from the vehicle.

Figure 4 is a fragmentary elevation of the control lever and adjuncts showing the position of the same when the rake is lowered.

Figure 5 is a similar view when the rake is raised.

Figure 6 is a top plan with the parts in the position as shown in Figure 4.

Figure 7 is a fragmentary transverse section view on the line 7—7 of Figure 2.

Figure 8 is a detail vertical section through one bracket.

Similar reference characters indicate corresponding parts throughout the several views in the drawings.

Referring to the drawings in detail, A designates generally a portion of a motor vehicle, in this instance of the truck type, although it may be of any other style and mounted fore of this vehicle is the rake attachment B constituting the present invention and hereinafter fully described.

The rake attachment B comprises a series of raking tines 10 which at their rear ends are joined with a cross bar 11, these making up the rake head proper, the joining of the tines 10 with the cross bar 11 being effected in any suitable manner for rigidity. Forwardly of the cross bar 11 is an upstanding guard or fence including spaced uprights 12, these having the outturned lower ends 13 which are bolted or otherwise fastened to a tubular rod 14 superimposed upon and secured to the tines 10 in advance of the cross bar 11 to be parallel therewith. The uprights 12 carry slats 15 which are parallel with each other in spaced relation crosswise of the guard or fence. Behind the guard or fence are upstanding braces 16, these being secured in place to the rake head and guard or fence in any desirable manner.

Arranged at opposite sides of the vehicle A are straight bar-like hangers 17, these having attaching plates 18 which are bolted or otherwise secured at 19 to the under sides of the running boards 20 of said vehicle, which plates are disposed crosswise of said boards as will be apparent from Figure 7, of the drawings. The hangers 17 are extended forwardly over the front L-beam 21 as carried at the front end of the chassis 22 of the vehicle A to rest thereon. By means of fasteners 23 a pair of brackets 24 arranged at opposite sides of the chassis adjustably suspend this L-beam from the front of the chassis of the vehicle, one of these brackets being shown in Figure 8 of the drawings.

The forward ends of the hangers 17 are fitted with bearings 25 in which is journaled the rod 14 so that the head of the rake can swing vertically.

Supplemental braces 26 are carried by the guard or fence to further reinforce and straighten the same.

On the hangers 17 are bearings 27, for a turning shaft 28 having cranks 29, these being outside of the hangers and are pivoted to shift arms 30, which at their forward ends 31 are adjustably connected by removable pins 32 in suitable slots in the upper portions of certain of the uprights 12.

Fixed to the shaft 28 at the side of the vehicle A next to the driver's seat (not shown) within its body is a ratchet wheel 33 with which coacts a ratchet dog or pawl 34 on a control lever 35 this being loose on said shaft for the ratchet action of the dog or pawl pivoted thereon with said wheel 33. Thus it will be seen from Figures 3, 5, and 6 of the drawings that the shaft 28 is positively turned in one direction or in other words rotates in one direction when the lever 35 is actuated, this lever being located in convenient reach of the driver of the vehicle, as the bearings 27 are especially located for this purpose.

When the lever 35 is actuated by the driver of the vehicle A, the rake head can be raised or lowered at will and when in lowered position is in raking operation.

The wheel 33 is engaged by a latching dog 36 which holds it against reverse rotation and latches the rake head in a raised or lowered position.

The ends 31 wear tensioning springs 37 which holds the pins 32 against the upper portions next thereto of the uprights 12 to avoid loose play.

The brackets 24 are formed with key-hole shape slots 38 in their upper ends for detachable engagement with headed fasteners 39 fitted in the forward ends of the side sills of the chassis.

The L-beam 21 is susceptible of vertical adjustment on the brackets 24, these being passed through suitable slotted portions of the beam as is clearly shown in Figure 8 of the drawings. By reason of the cranks 29 turning with the ratchet wheel 33 in the same direction throughout a complete circle the rake head with its tines 10 will be raised and lowered, the head being rocked for such movement with the rod 14 which is journaled in the bearings 25 on the forward ends of the hangers 17.

What is claimed is:—

1. In an attachment of the kind described for motor vehicles having a chassis and side running boards, a tined rake head, an upright guard rising from the rear of the latter, a pair of spaced straight bars forming hangers having forward bearings pivotally connecting the head therewith, attaching plates bolted to opposite running boards of the vehicle and extending laterally therefrom, vertical perforated brackets secured to the forward end of the chassis of the vehicle, a substantially L-shaped bar crosswise of the chassis, bolts adjustably engaged in the brackets and having the L-shaped bar resting thereon, bolts fastening the straight bars to the L-bar and said attaching plates, respectively, and lever actuated means in reach of an operator of said vehicle when seated therein for raising and lowering the head.

2. In an attachment of the kind described for motor vehicles having a chassis and side running boards, a tined rake head, an upright guard rising from the rear of the latter, a pair of spaced straight bars forming hangers having forward bearings pivotally connecting the head therewith, attaching plates bolted to opposite running boards of the vehicle and extending laterally therefrom, vertical perforated brackets secured to the forward end of the chassis of the vehicle, a substantially L-shaped bar crosswise of the chassis, bolts adjustably engaged in the brackets and having the L-shaped bar resting thereon, bolts fastening the straight bars to the L-shaped bar and said attaching plates, respectively, lever actuated means in reach of an operator of said vehicle when seated therein for raising and lowering the head, and adjustable pivotal couplings between the lever actuated means and the guard.

ALBERT L. STOCKWELL.